US012075536B2

(12) United States Patent
Seminara et al.

(10) Patent No.: US 12,075,536 B2
(45) Date of Patent: *Aug. 27, 2024

(54) LED ARRAY DRIVER SYSTEM

(71) Applicant: STMicroelectronics S.r.l., Agrate Brianza (IT)

(72) Inventors: Maria Francesca Seminara, Catania (IT); Salvatore Rosario Musumeci, Fiumefreddo di Sic (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 3 days.

This patent is subject to a terminal disclaimer.

(21) Appl. No.: 18/062,929

(22) Filed: Dec. 7, 2022

(65) Prior Publication Data

US 2023/0135666 A1 May 4, 2023

Related U.S. Application Data

(63) Continuation of application No. 17/313,480, filed on May 6, 2021, now Pat. No. 11,546,980.

(30) Foreign Application Priority Data

Jun. 8, 2020 (IT) ........................ 102020000013561

(51) Int. Cl.
*H05B 45/397* (2020.01)
*H05B 45/14* (2020.01)

(52) U.S. Cl.
CPC ........... *H05B 45/397* (2020.01); *H05B 45/14* (2020.01)

(58) Field of Classification Search
CPC .... H05B 45/397; H05B 45/14; H05B 45/325; H05B 45/30; H05B 45/36
See application file for complete search history.

(56) References Cited

U.S. PATENT DOCUMENTS

| | | | | |
|---|---|---|---|---|
| 8,237,376 | B2 | 8/2012 | Franco | |
| 9,392,661 | B2 | 7/2016 | Schiappelli et al. | |
| 11,546,980 | B2 * | 1/2023 | Seminara ............... | H05B 45/14 |
| 2011/0273102 | A1 * | 11/2011 | van de Ven ............ | H05B 45/48 315/193 |
| 2012/0165960 | A1 * | 6/2012 | Westwick .............. | H05B 47/18 700/12 |

(Continued)

FOREIGN PATENT DOCUMENTS

JP H05335911 A 12/1993

*Primary Examiner* — Abdullah A Riyami
*Assistant Examiner* — Syed M Kaiser
(74) *Attorney, Agent, or Firm* — Slater Matsil, LLP

(57) ABSTRACT

An embodiment LED driver system comprises a power transistor configured to be selectively activated for generating a driving current for an array of LEDs, the power transistor having a first conduction terminal coupled to the array of LEDs and a second conduction terminal coupled to a reference resistor; an operational amplifier having a non-inverting input for receiving a reference voltage, an inverting input coupled to the second conduction terminal of the power transistor, and an output terminal coupled to a first conduction terminal of a transmission gate having a second conduction terminal coupled to a control terminal of the power transistor and a control terminal for receiving an enable signal; and a slew rate control unit configured to control the slew rate of the driving current.

20 Claims, 11 Drawing Sheets

(56) References Cited

U.S. PATENT DOCUMENTS

| | | | | |
|---|---|---|---|---|
| 2016/0036237 | A1* | 2/2016 | Kim | H05B 45/46 307/31 |
| 2016/0095181 | A1 | 3/2016 | Schiappelli et al. | |
| 2019/0025865 | A1 | 1/2019 | Narayanan et al. | |

* cited by examiner

FIG.3A
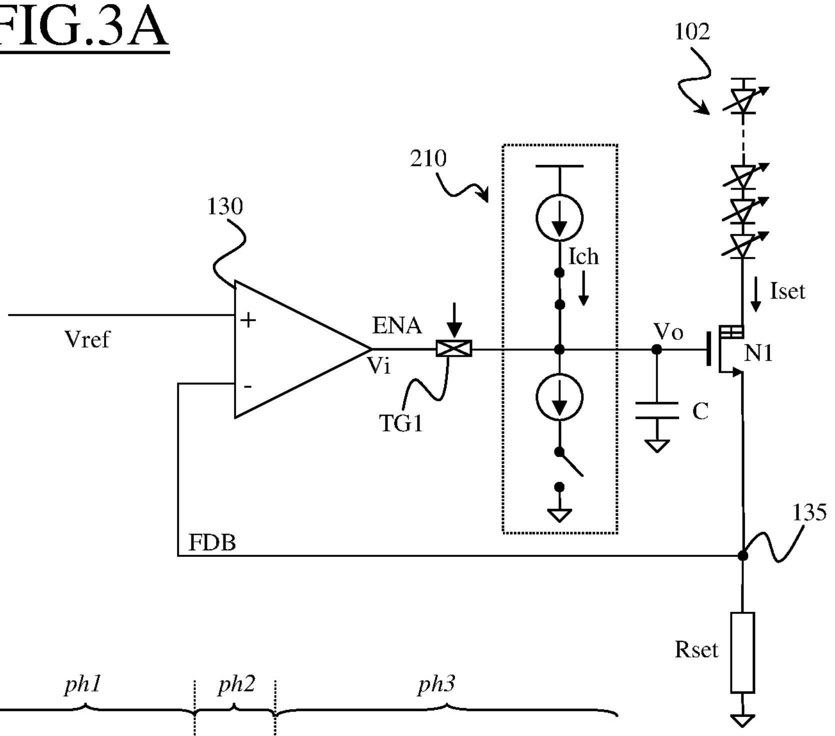
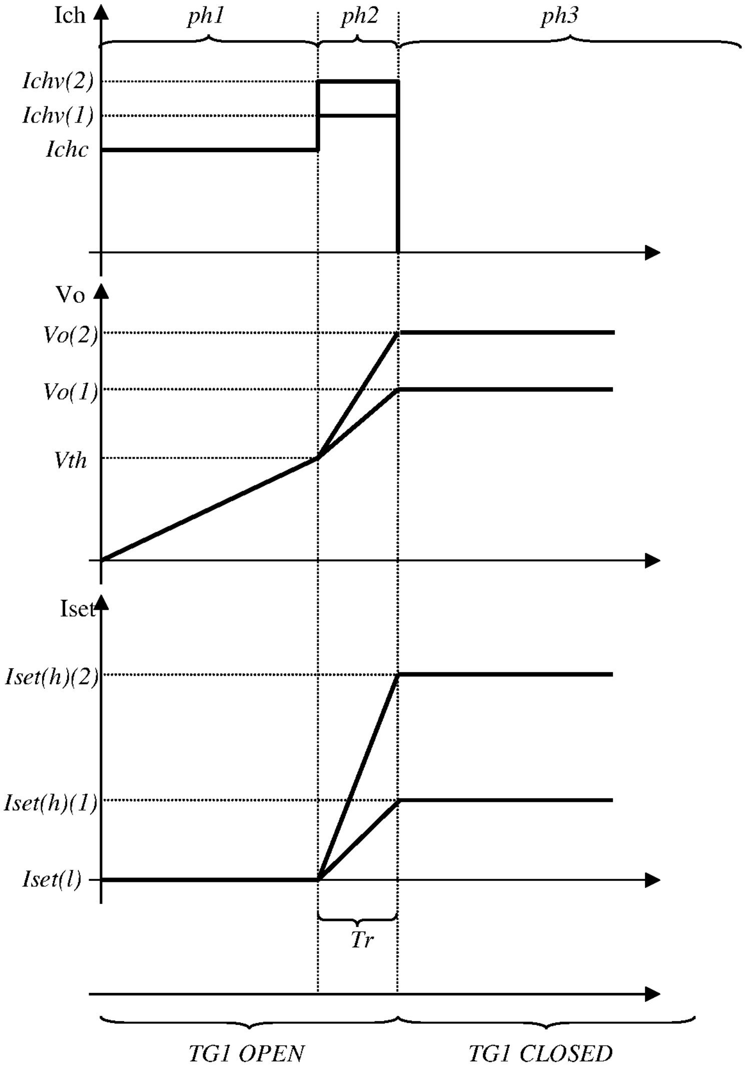
FIG.3B

FIG.4A
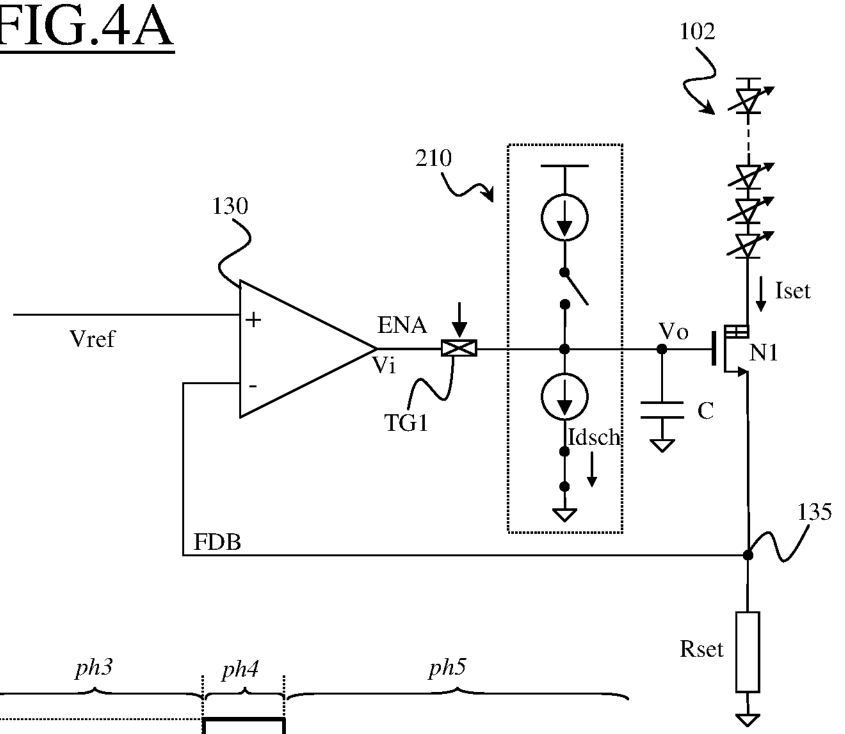
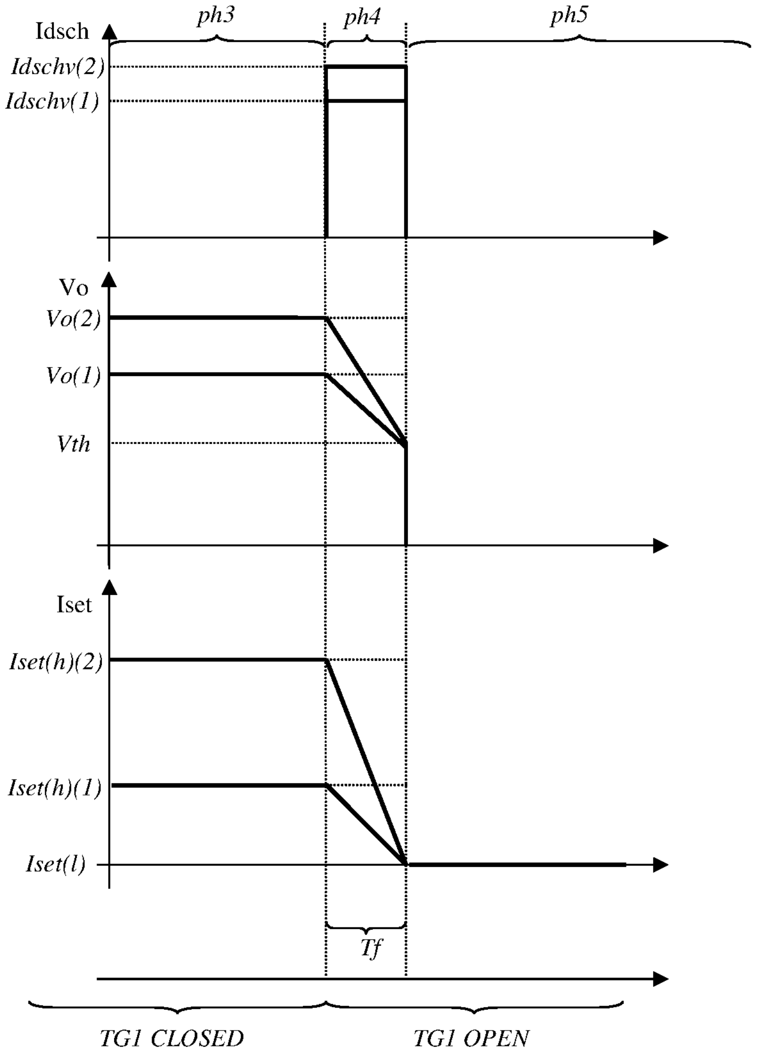
FIG.4B

LED ARRAY DRIVER SYSTEM

CROSS-REFERENCE TO RELATED APPLICATIONS

This application is a continuation of U.S. patent application Ser. No. 17/313,480, filed May 6, 2021, which application claims the benefit of Italian Application No. 102020000013561, filed on Jun. 8, 2020, which applications are hereby incorporated herein by reference.

TECHNICAL FIELD

The present invention relates generally to the field of electronics, and more particularly to an LED driver system.

BACKGROUND

In order to drive Light Emitting Diodes (LEDs), LED driver systems are known, configured to control the current flowing across the LEDs.

Different kinds of LED driver system architectures are known in the art.

For example, FIG. 1 illustrates an LED driver system 100 having a V2I ("voltage to current") architecture, configured to drive an array of LEDs 102.

The LED driver system 100 comprises an operational amplifier 104 having a non-inverting input configured to receive a voltage Vbuff, an output terminal connected to the control terminal (e.g., the gate) of a transistor 108, for example a n-type metal oxide semiconductor (MOS) transistor, and an inverting input terminal connected to a conduction terminal (e.g., the source) of the transistor 108. The inverting input terminal of the operational amplifier 104 is further connected to a first terminal of an external resistor Rext, the second terminal of the latter being connected to a reference terminal (GND terminal) providing a ground voltage.

Another conduction terminal (e.g., the drain) of the transistor 108 is connected to an input terminal of a current mirror 120. The current mirror 120 has an output terminal connected to the input terminal of a resistor ladder Digital to Analog Converter (DAC) 125 for providing a high precision reference current Iref which is a mirrored version of an external current Iext flowing through the external resistor Rext, which is in turn a function of the external resistor Rext and of the voltage Vbuff.

The DAC 125 has an output terminal for providing a reference voltage Vref based on the reference current Iref to a non-inverting input terminal of an operational amplifier 130. The operational amplifier 130 has an output terminal connected to a first conduction terminal of a transmission gate TG1 for providing a voltage Vi. The transmission gate TG1 has a second conduction terminal connected to a control terminal (e.g., the gate) of a power transistor N1, for example an n-type power MOS transistor, for providing a voltage V0.

The power transistor N1 has a conduction terminal (e.g., the source) connected to a non-inverting terminal of the operational amplifier 130 and to a first conduction terminal of a reference resistor Rset, defining a circuit node 135. The reference resistor Rset has a second conduction terminal connected to the ground terminal GND. The power transistor N1 has a further conduction terminal (e.g., the drain) connected to the array of LEDs 102.

The transmission gate TG1 has a control terminal for receiving a Pulse Width Modulated (PWM) control signal CRL pulsing between a high and a low value.

When the control signal CTRL is at the high value, the first and the second conduction terminals of the transmission gate TG1 are electrically connected to each other, so that the voltage V0 is brought to the voltage Vi, a feedback voltage FDB at circuit node 135 is brought to the reference voltage Vref, and the array of LEDs 102 is crossed by a driving current Iset having a value Iset(h) corresponding to the reference voltage Vref divided by the resistance of the reference resistor Rset.

When the control signal CTRL is at the low value, the first conduction terminal of the transmission gate TG1 is electrically insulated from the second conduction terminal of the transmission gate TG1, and the driving current Iset is at a value Iset(l) equal to zero.

In this way, it is possible to deliver the driving current Iset in the form of current pulses, the duty cycle thereof being based on the duty cycle of the control signal CTRL. By varying the duty cycle of the control signal CTRL (for example at frequencies higher than 100 Hz), it is therefore possible to regulate the intensity of the light emitted by the LEDs. This LED control technique is referred to as digital dimming.

In order to avoid, or at least reduce, control errors when driving the array of LEDs 102 at a low duty cycle, the driving current Iset should have fast rising/falling edges (i.e., a low slew rate).

According to a solution known in the art, fast rising/falling edges are obtained by keeping the voltage Vi output by the operational amplifier 130 close to the target voltage V0 at the gate of the power transistor N1 through the provision of a scaled duplicate of the power transistor N1 and of the reference resistor Rset, connected in such a way to form a duplicate of the feedback loop between the operational amplifier 130 and the power transistor N1, and with a transmission gate controlled by a negated version of the control signal CTRL (i.e., a version thereof having a phase difference of 180°).

SUMMARY

The Applicant has found that the abovementioned known solution for controlling LEDs with a current having reduced slew rate is affected by several drawbacks.

First of all, according to the known solutions, while the slew rate is reduced, no control can be achieved on the actual speed/duration of the rising/falling edges, which is always fixed for a given current value, and therefore cannot be scaled to fulfill requirements of specific applications, independently of the actual value of the current.

Moreover, the fast current rising/falling edges obtained with the known solution may cause undesired Electromagnetic Interference (EMI).

In view of the above, the Applicant has devised a solution for solving, or at least reducing the abovementioned drawbacks.

An aspect of the present invention relates to an LED driver system adapted to be coupled to an array of LEDs for driving the array of LEDs, the LED driver system comprising:

- a power transistor configured to be selectively activated for generating a driving current for the array of LEDs, the power transistor having a first conduction terminal coupled to the array of LEDs and a second conduction terminal coupled to a reference resistor;

an operational amplifier having a non-inverting input for receiving a reference voltage, an inverting input coupled to the second conduction terminal of the power transistor, and an output terminal coupled to a first conduction terminal of a transmission gate, the transmission gate having a second conduction terminal coupled to a control terminal of the power transistor and a control terminal for receiving an enable signal, the first and second conduction terminals of the transmission gate being electrically connected to each other when the enable signal is at an enabling value to cause activation of the power transistor, and being electrically insulated from each other when the enable signal is at a disabling value to cause deactivation of the power transistor; and a slew rate control unit configured to control the slew rate of the driving current, the slew rate control unit being configured to selectively charge an equivalent capacitance at the control terminal of the power transistor through a charging current and to selectively discharge the equivalent capacitance through a discharging current, the charging current and the discharging current depending at least in part on a target value of the driving current.

According to an embodiment of the present invention, the slew rate control unit is configured in such a way to:

set the charging current to a first charge value different from zero and independent from the target value during a first operative phase of the slew rate control unit, set the charging current to a second charge value different from zero and depending on the target value during a second operative phase of the slew rate control unit following the first operative phase;

set the charging current to zero during a third operative phase of the slew rate control unit following the second operative phase;

set the discharging current to a discharge value different from zero and depending on the target value during a fourth operative phase of the slew rate control unit following the third operative phase; and set the discharging current to zero during a fifth operative phase of the slew rate control unit following the fourth operative phase.

According to an embodiment of the present invention, the second charge value corresponds to the target value multiplied by a first proportionality coefficient.

According to an embodiment of the present invention, the slew rate control unit is further configured to set a duration of a rising edge of the driving current during the second operative phase to a value corresponding to a second proportionality coefficient multiplied by a ratio between the target value and the second charge value.

According to an embodiment of the present invention, the discharge value to the target value multiplied by a third proportionality coefficient.

According to an embodiment of the present invention, the slew rate control unit is further configured to set a duration of a falling edge of the driving current during the fourth operative phase to a value corresponding to a fourth proportionality coefficient multiplied by a ratio between the target value and the discharge value.

According to an embodiment of the present invention, the slew rate control unit is configured to set the enable signal to the disabling value during the first, second, fourth and fifth operative phases.

According to an embodiment of the present invention, the slew rate control unit is configured to set the enable signal to the enabling value during the third operative phase.

According to an embodiment of the present invention, the LED driver system further comprises a first current mirror configured to output a reference current and a control current according to an external current.

According to an embodiment of the present invention, the reference voltage depends on the reference current.

According to an embodiment of the present invention, the charging current and the discharging current depend on the control current.

According to an embodiment of the present invention, the slew rate control unit comprises a second current mirror configured to generate the discharging current during the fourth operative phase according to the control current.

According to an embodiment of the present invention, the slew rate control unit comprises a third current mirror configured to generate the charging current during the second operative phase according to the control current.

According to an embodiment of the present invention, the first and third proportionality coefficients depend on mirror ratios of the first, second and third current mirrors.

According to an embodiment of the present invention, the second and fourth proportionality coefficients depend on the reference resistor.

According to an embodiment of the present invention, the power transistor is off during the first and fifth operative phases.

According to an embodiment of the present invention, the slew rate control unit is configured to switch:

from the first operative phase to the second operative phase when the voltage at the control terminal of the power transistor rises to an extent such to turn on the power transistor, and from the fourth operative phase to the fifth operative phase when the voltage at the control terminal of the power transistor falls to an extent such to turn off the power transistor.

According to an embodiment of the present invention, the slew rate control unit is configured so that the charging current increases the voltage at the control terminal of the power transistor from a first voltage value to a second voltage value corresponding to a threshold voltage of the power transistor during the first operative phase.

According to an embodiment of the present invention, the slew rate control unit is configured so that the charging current increases the voltage at the control terminal of the power transistor from the second voltage value to a third voltage value during the second operative phase.

According to an embodiment of the present invention, the slew rate control unit is configured so that the voltage at the control terminal of the power transistor is kept at the third voltage value during the third operative phase.

According to an embodiment of the present invention, the slew rate control unit is configured so that the discharging current decreases the voltage at the control terminal of the power transistor from the third voltage value to the second voltage value during the fourth operative phase.

According to an embodiment of the present invention, the slew rate control unit is configured so that the voltage at the control terminal of the power transistor is kept at the first voltage value during the fifth operative phase.

According to an embodiment of the present invention, the third voltage is such to cause the power transistor to generate a driving current having the target value.

Another aspect of the present invention relates to an electronic system comprising one or more LED driver systems and a respective array of LED coupled to the one or more LED driver system.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings. In this regard, it is explicitly intended that the drawings are simply used for conceptually illustrating the described structures and procedures. Particularly:

FIG. 3A shows a simplified depiction of a slew rate control unit of the LED driver system illustrated in FIG. 2 during a first set of operative phases according to an embodiment of the present invention;

FIG. 3B illustrates time diagrams of voltages and currents in the LED driver system during the first set of operative phases according to an embodiment of the present invention;

FIG. 4A shows a simplified depiction of a slew rate control unit of the LED driver system illustrated in FIG. 2 during a second set of operative phases according to an embodiment of the present invention;

FIG. 4B illustrates time diagrams of voltages and currents in the LED driver system during the second set of operative phases according to an embodiment of the present invention;

DETAILED DESCRIPTION OF ILLUSTRATIVE EMBODIMENTS

Figure 1:
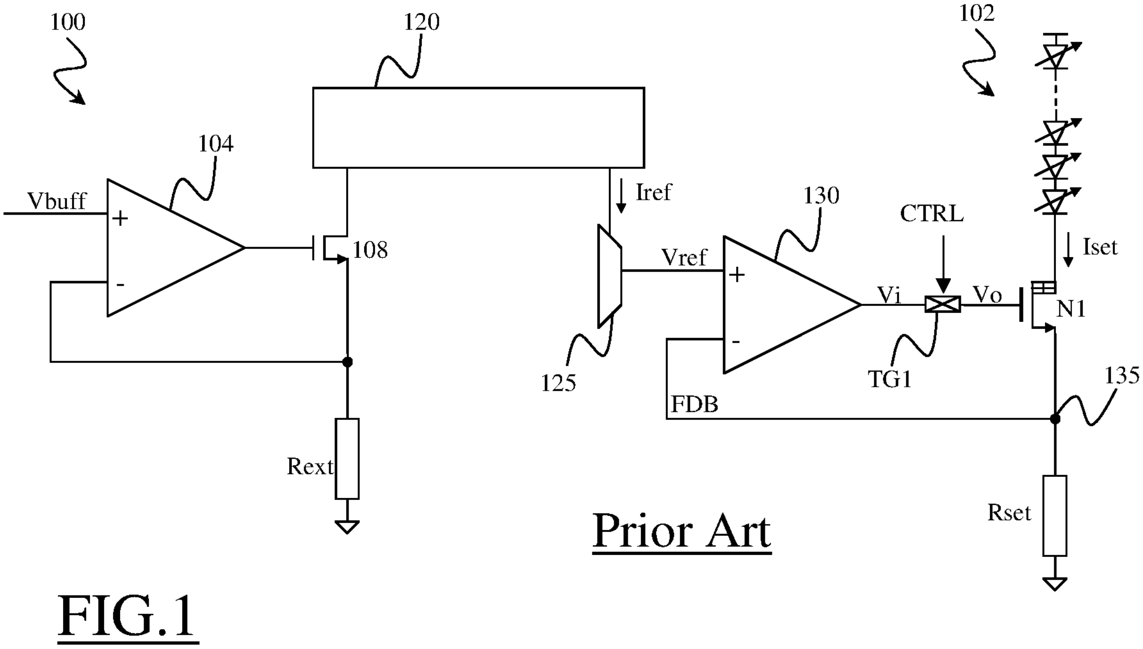
FIG. 1 illustrates an LED driver system according to a solution known in the art.
Figure 2:
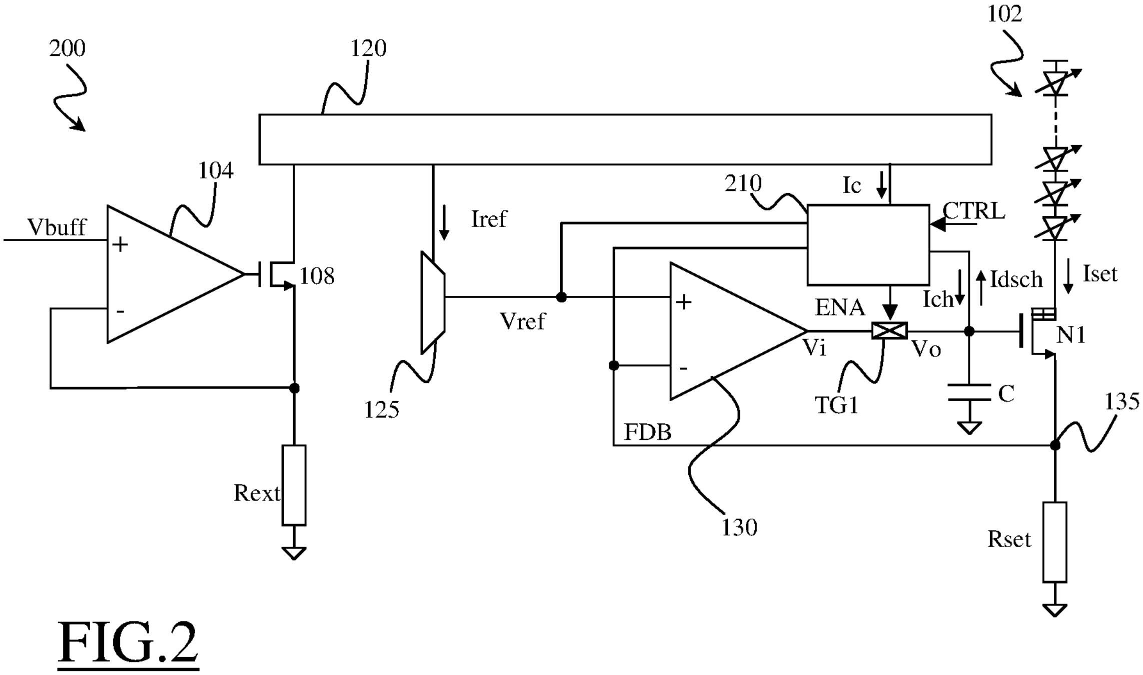
FIG. 2 illustrates an LED driver system according to an embodiment of the present invention.

FIG. 2 illustrates an LED driver system 200 configured to drive an array of LEDs 102 according to an embodiment of the present invention. Elements of the LED driver system 200 in common with the LED driver system 100 of FIG. 1 are identified by the same references, and their description is omitted for the sake of conciseness.

Compared to the known LED driver system 100 of FIG. 1, the LED driver system 200 according to an embodiment of the present invention comprises a slew rate control unit 210 adapted to control the slew rate of the driving current Iset generated by the LED driver system 200 for driving the array of LEDs 102.

According to an embodiment of the present invention, the slew rate control unit 210 has an input for receiving the control signal CTRL, an input coupled to the non-inverting terminal of the operational amplifier 130 for receiving the reference voltage Vref, and an input coupled to the inverting terminal of the operational amplifier 130 for receiving the feedback voltage FDB.

According to an embodiment of the present invention, the slew rate control unit 210 is configured to set the duration of the rising and falling edges of the driving current Iset independently from the value of the driving current Iset by properly charging/discharging an equivalent (e.g., parasitic) capacitance C at the gate terminal of the power transistor N1 through a proper charging current Ich and a proper discharging current Idsch. For this reason, according to an embodiment of the present invention, the slew rate control unit 210 has an output coupled to the gate terminal of the power transistor N1 and configured to selective provide the charging current Ich and the discharging current Idsch. According to an embodiment of the present invention, and as it will be described in detail in the following, the slew rate control unit 210 is configured to generate the charging current Ich and the discharging current Idsch according to a control current Ic provided by the current mirror 120 and depending on a target value of the driving current Iset.

According to an embodiment of the present invention, the slew rate control unit 210 is configured to generate an enable signal ENA to be used in place of the control signal CTRL for driving the opening and closing of the transmission gate TG1.

By making reference to the simplified depiction of the slew rate control unit 210 illustrated in FIG. 3A, and to the exemplary time diagrams illustrated in FIG. 3B, according to an embodiment of the present invention, the slew rate control unit 210 is configured to set the duration Tr of the rising edge of the driving current Iset by charging the equivalent capacitance C at the gate terminal of the power transistor N1 with a charging current Ich generated in the following way:

- during a first phase, identified in FIG. 3B with reference ph1, the charging current Ich is set by the slew rate control unit 210 to a value Ichc, independent from the value of the target driving current Iset; and
- during a second phase, identified in FIG. 3B with reference ph2, the charging current Ich is set by the slew rate control unit 210 to a value Ichv that depends on the target value Iset(h) of the driving current Iset.

According to an embodiment of the present invention, during the first phase ph1, the voltage V0 at the gate terminal of the power transistor N1 rises from the ground voltage to a value for which the voltage difference Vgs across the gate terminal and the source terminal of the power transistor N1 reaches the threshold voltage Vth of the power transistor N1 (i.e., rises until the power transistor N1 turns on).

According to an embodiment of the present invention, during the second phase ph2, the voltage V0 rises until it reaches a value causing the driving current Iset to reach the value Iset(h).

According to an embodiment of the present invention, the slew rate control unit 210 sets the value Ichv taken by the charging current Ich in the second phase ph2 to a value depending on the (target) value Iset(h).

As will be described in greater detail in the following of the present description, according to an embodiment of the present invention, the slew rate control unit 210 is configured to set the value Ichv taken by the charging current Ich in the second phase ph2 to a value that is directly proportional to the (target) value Iset(h), i.e.:

$$Ichv = A \times Iset(h) \quad (1)$$

where A is a proportionality coefficient.

According to an embodiment of the present invention, the higher the value Iset(h) of the driving current Iset, the higher the value Ichv of the charging current Ich in the second phase ph2, and therefore the faster the charging of the equivalent capacitance C.

As will be described in greater detail in the following of the present description, according to an embodiment of the present invention, the slew rate control 210 is configured to set the duration Tr of the rising edge of the driving current Iset (from the value Iset(l) to the value Iset(h)) to a value that is directly proportional to the (target) value Iset(h) and inversely proportional to the value Ichv taken by the charging current Ich in the second phase ph2, i.e.:

$$Tr = B \times \frac{Iset(h)}{Ichv} \quad (2)$$

where B is a proportionality coefficient.

Therefore, according to an embodiment of the present invention the resulting duration T of the rising edge of the driving current Iset from the value Iset(l) to the value Iset(h) can be advantageously set regardless of the value Iset(h) of the driving current Iset, i.e., by merging equations (1) and (2):

$$Tr = B/A \quad (3).$$

In other words, the slew rate control unit 210 according to embodiments of the present invention allows obtaining a same duration T of the rising edge of the driving current Iset for different values Iset(h). It has to be appreciated that the duration T of the rising edge of the driving current Iset according to an embodiment of the present invention is equal to the duration of the second phase ph2.

In the exemplary time diagrams illustrated in FIG. 3B, two exemplary cases are shown, namely a first case in which the driving current Iset rises from a value Iset(l) to a value Iset(h)(1), and a second case in which the driving current Iset rises from the same value Iset(l) to a value Iset(h)(2) higher than Iset(h)(1). During the first phase ph1, the charging current Ich is set by the slew rate control unit 210 to a same value Ichc in both the two cases.

In the first case, the charging current Ich is set by the slew rate control unit 210 during the second phase ph2 to a value Ichv(1) depending on the value Iset(h)(1), so that the voltage V0 reaches a value V0(1) causing the driving current Iset to rise until Iset(h)(1) in a time period equal to Tr.

In the second case, the charging current Ich is set by the slew rate control unit 210 during the second phase ph2 to a value Ichv(2) depending on the value Iset(h)(2), so that the voltage V0 reaches a value V0(2) (higher than V0(1)) causing the driving current Iset to rise until Iset(h)(2) (higher than Iset(h)(2)) in the same time period equal to T.

According to an embodiment of the present invention, the slew rate control unit 210 keeps the enable signal ENA to the low value—thereby keeping open the transmission gate TG1—during both the first and second phases ph1, ph2. At the beginning of a third phase ph3 following the second phase ph2, i.e., once the voltage V0 at the gate terminal of the power transistor N1 reached the value causing the driving current Iset to reach the (target) value Iset(h), the slew rate control unit 210 switches the enable signal ENA to the high value, closing the transmission gate TG1.

In this way, the transient between open loop condition (transmission gate TG1 open) and closed loop condition (transmission gate TG1 closed) is carried out smoothly, with the voltage V0 which is very close to the voltage Vi.

By making reference to the simplified depiction of the slew rate control unit 210 illustrated in FIG. 4A, and to the exemplary time diagrams illustrated in FIG. 4B, according to an embodiment of the present invention, the slew rate control unit 210 is configured to set the duration Tf of the falling edge of the driving current Iset by discharging the equivalent capacitance C at the gate terminal of the power transistor N1 with a discharging current Idsch in the following way:

during a fourth phase, identified in FIG. 4B with reference ph4, the discharging current Idsch is set by the slew rate control unit 210 to a value Idschv that depends on the (target) value Iset(h) of the driving current Iset.

According to an embodiment of the present invention, during the fourth phase ph4, the voltage V0 falls from the value causing the driving current Iset to have value Iset(h) to a value such that the voltage difference Vgs across the gate terminal and the source terminal of the power transistor N1 reaches the threshold voltage Vth of the power transistor N1, causing the power transistor N1 to turn off.

According to an embodiment of the present invention, the slew rate control unit 210 sets the value Idschv to a value depending on the (target) value Iset(h).

As will be described in greater detail in the following of the present description, according to an embodiment of the present invention, the slew rate control unit 210 is configured to set the value Idschv taken by the discharging current Idsch in the fourth phase ph4 to a value that is directly proportional to the (target) value Iset(h), i.e.:

$$Idschv = A' \times Iset(h) \quad (4)$$

where A' is a proportionality coefficient, for example equal to the coefficient A of equation (1).

According to an embodiment of the present invention, the higher the value Iset(h) of the driving current Iset, the higher the value Idschv of the discharging current Idsch in the fourth phase ph4, and therefore the faster the discharging of the equivalent capacitance C.

As will be described in greater detail in the following of the present description, according to an embodiment of the present invention, the slew rate control 210 is configured to set the duration Tf of the falling edge of the driving current Iset (from the value Iset(h) to the value Iset(l)) to a value that is directly proportional to the value Iset(h) and inversely proportional to the value Ichv taken by the discharging current Idsch in the fourth phase ph4, i.e.:

$$Tf = B' \times \frac{Iset(h)}{Idschv} \quad (5)$$

where B is a proportionality coefficient, for example equal to the coefficient B of equation (2).

Therefore, according to an embodiment of the present invention the resulting duration Tf of the falling edge of the driving current Iset from the value Iset(h) to the value Iset(l)

can be advantageously set regardless of the value Iset(h) of the driving current Iset, i.e., by merging equations (4) and (5):

$$Tr=B'/A' \quad (6).$$

In other words, the slew rate control unit 210 according to embodiments of the present invention allows obtaining a same duration Tf of the falling edge of the driving current Iset for different values Iset(h). It has to be appreciated that the duration Tf of the falling edge of the driving current Iset according to an embodiment of the present invention is equal to the duration of the fourth phase ph4. According to an embodiment of the present invention, the duration Tf of the falling edge is equal to the duration Tr of the rising edge.

In the exemplary time diagrams illustrated in FIG. 4B, two exemplary cases are shown, namely a first case in which the driving current Iset falls from the value Iset(h)(1) to the value Iset(l), and a second case in which the driving current Iset falls from the value Iset(h)(2) (higher than Iset(h)(1)) to the value Iset(l).

In the first case, the discharging current Idsch is set by the slew rate control unit 210 during the fourth phase ph4 to a value Idschv(1) depending on the value Iset(h)(1), so that the voltage V0 falls from the value V0(1) to the threshold voltage value Vth in a time period equal to Tf.

In the second case, the discharging current Idsch is set by the slew rate control unit 210 during the fourth phase ph4 to a value Idschv(2) depending on the value Iset(h)(2), so that the voltage V0 falls from the value V0(2) (higher than V0(1)) to the threshold voltage value Vth in the same time period equal to Tf.

According to an embodiment of the present invention, the slew rate control unit 210 switches the enable signal ENA to the low value—thereby opening the transmission gate TG1—at the beginning of the fourth phase ph4.

In this way, the transient between closed loop condition (transmission gate TG1 closed) and open loop condition (transmission gate TG1 open) is carried out smoothly, with the voltage V0 which is very close to the voltage Vi.

According to an embodiment of the present invention, as soon as the power transistor N1 is turned off, the voltage V0 is brought to the ground voltage by means of a pull down circuit (not visible in FIG. 4A), and kept to the ground voltage during a following fifth phase ph5.

At this point, after phase ph5 is expired, the procedure is reiterated, and the first phase ph1 is started again.

Reassuming, with the slew rate control unit 210 to embodiments of the present invention, the resulting driving current Iset is therefore oscillating between:

- a low value Iset(l), at phases ph1 and ph5, and
- a high value Iset(h) (in the illustrated examples, Iset(h)(1) or Iset(h(2)), at phase ph3, with a rising edge having a duration Tr corresponding to the duration of phase ph2 and a falling edge having a duration Tf corresponding to the duration of phase ph4.

Figure 5:
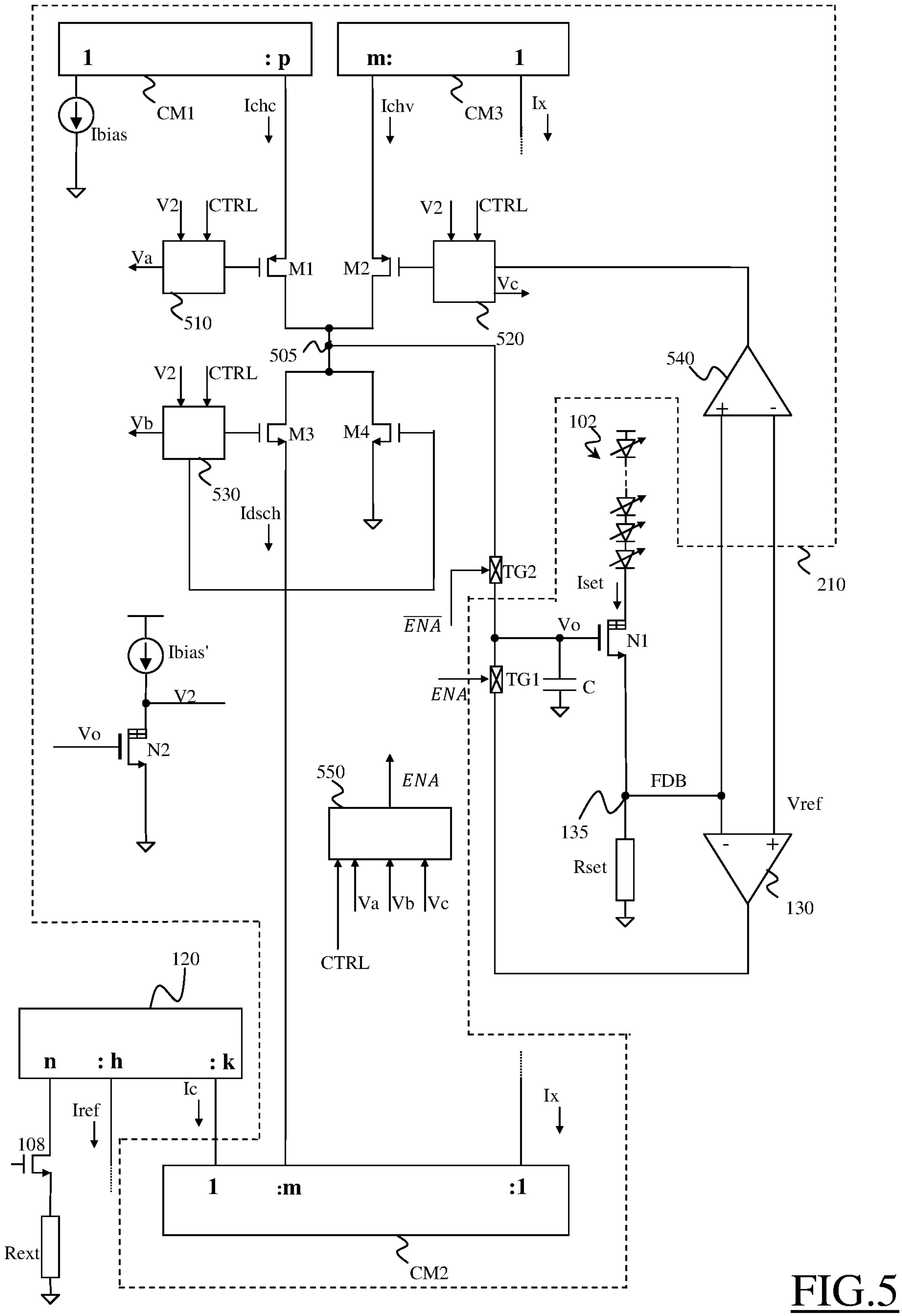
FIG. 5 illustrates in details an exemplary implementation of a slew rate control unit according to an embodiment of the present invention.
Figure 6A:
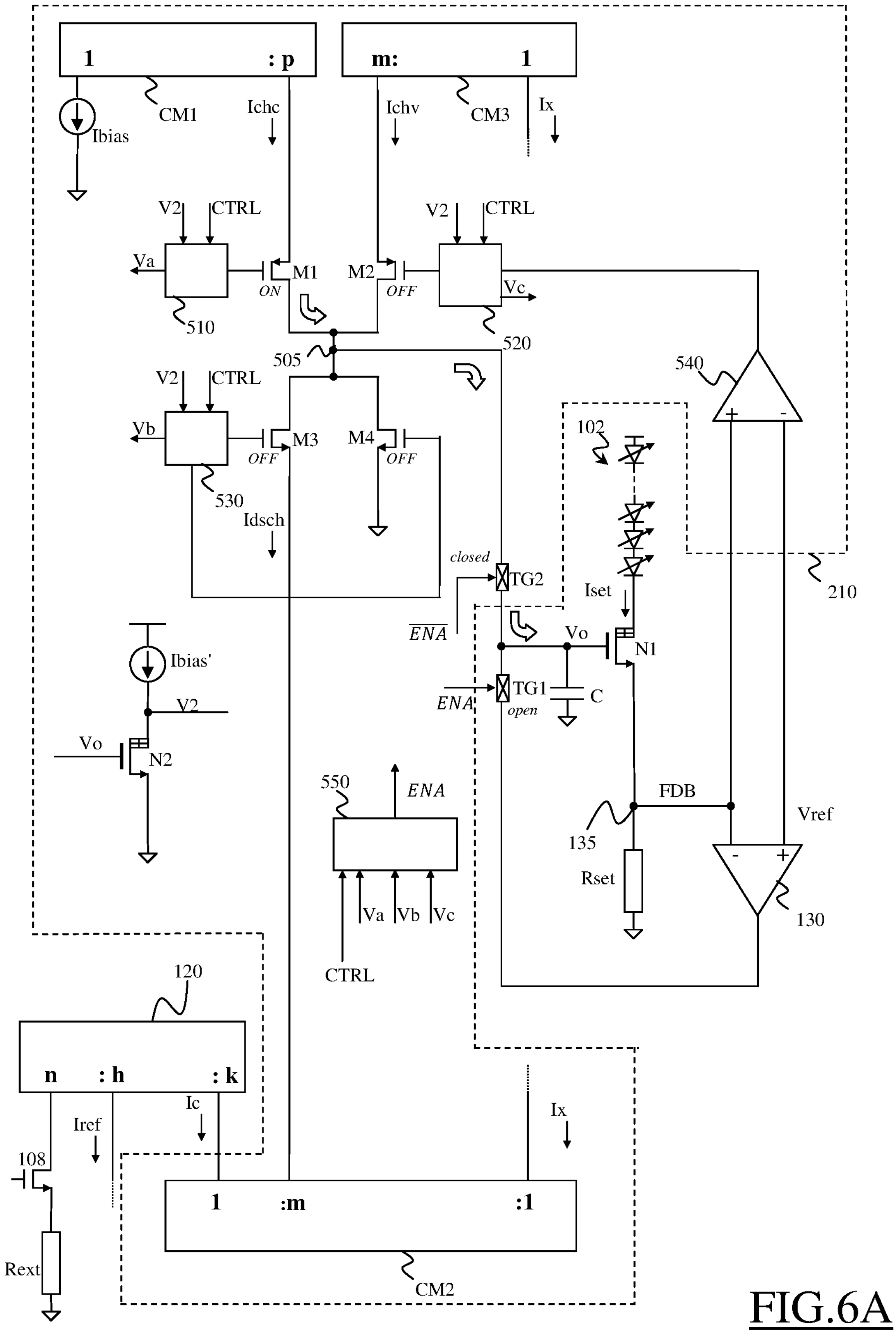
FIGS. 6A-6E illustrate how the slew rate control unit of FIG. 5 operates during the operative phases illustrated in FIGS. 3A and 3B according to an embodiment of the present invention.
Figure 6B:
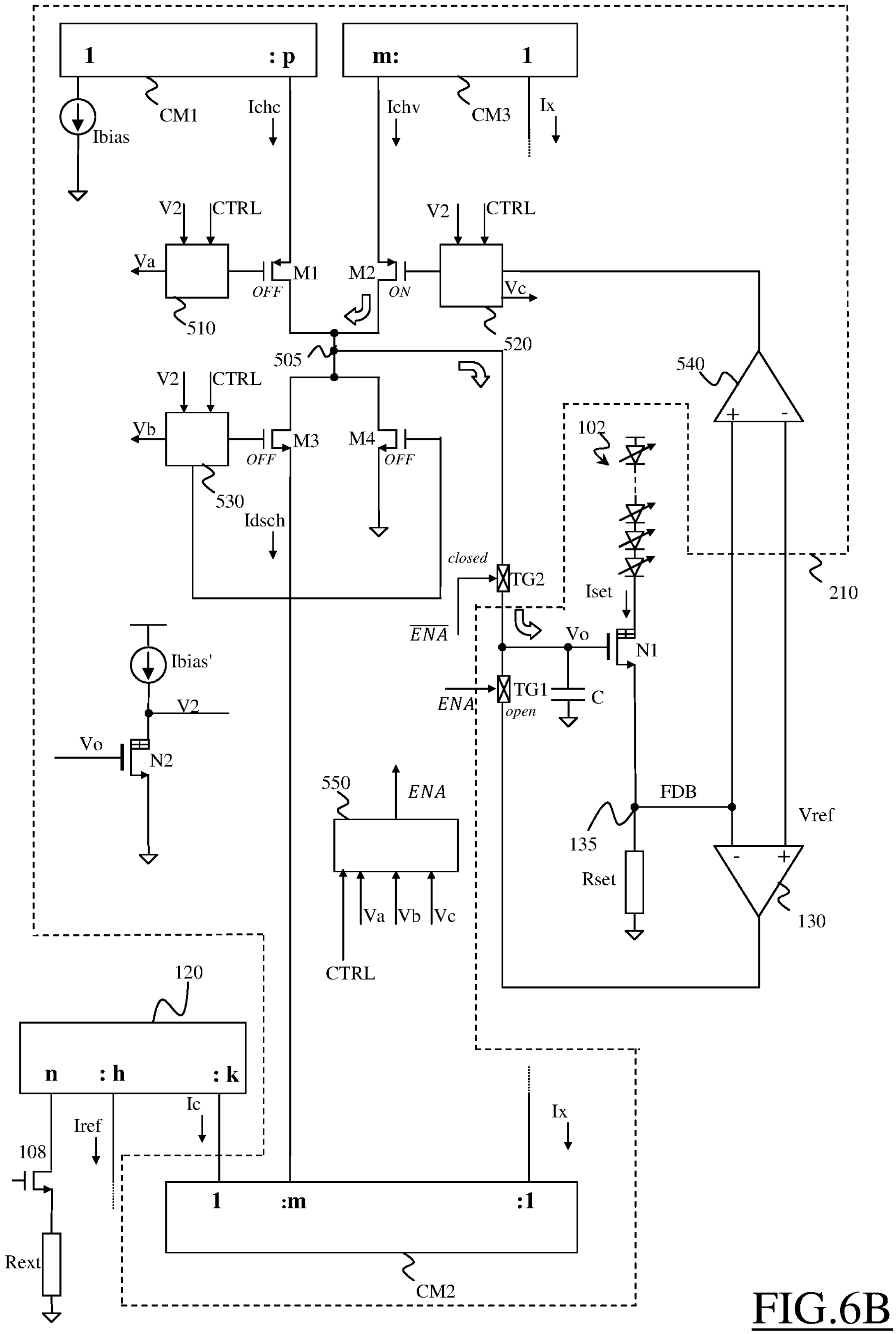
Figure 6C:
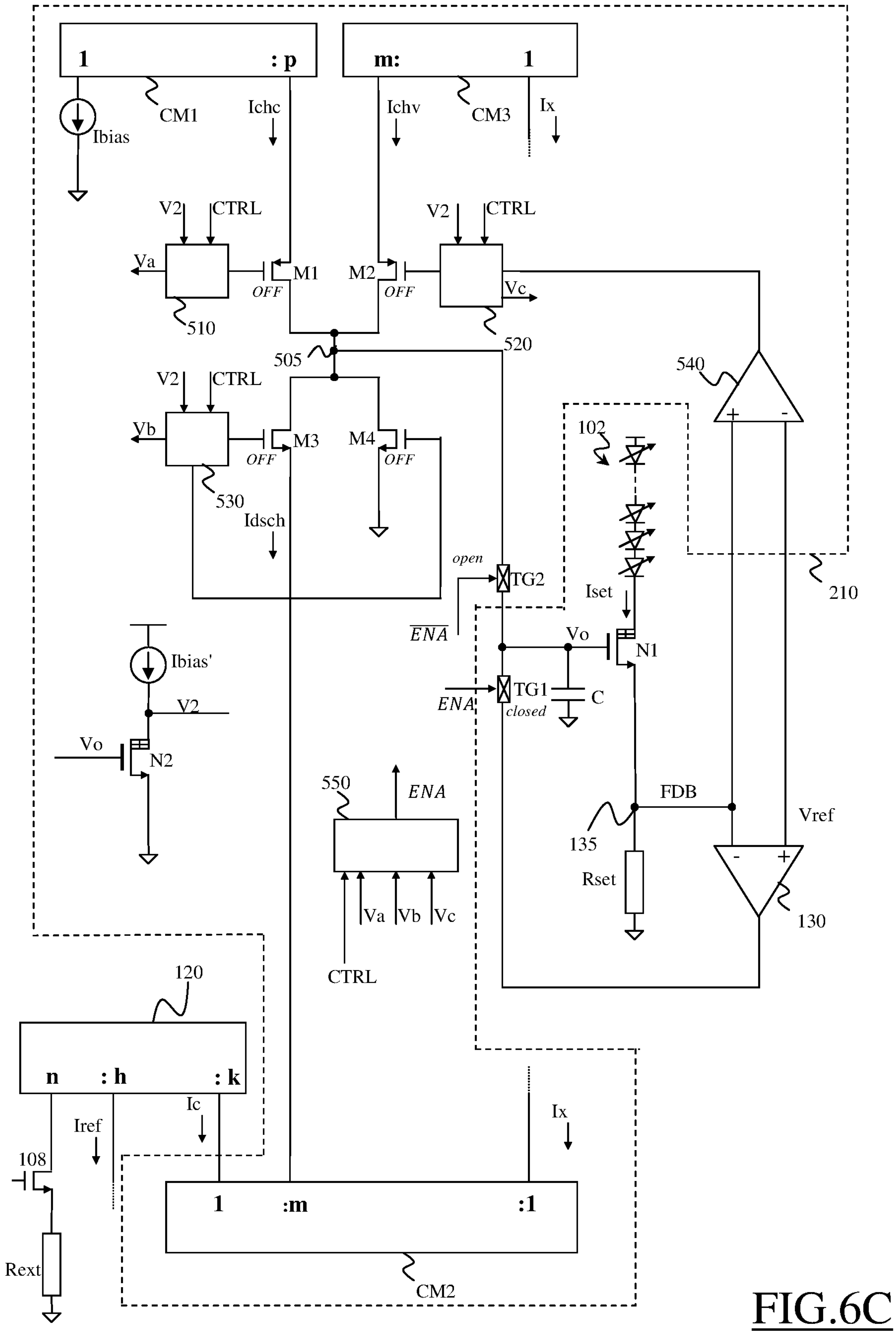
Figure 6D:
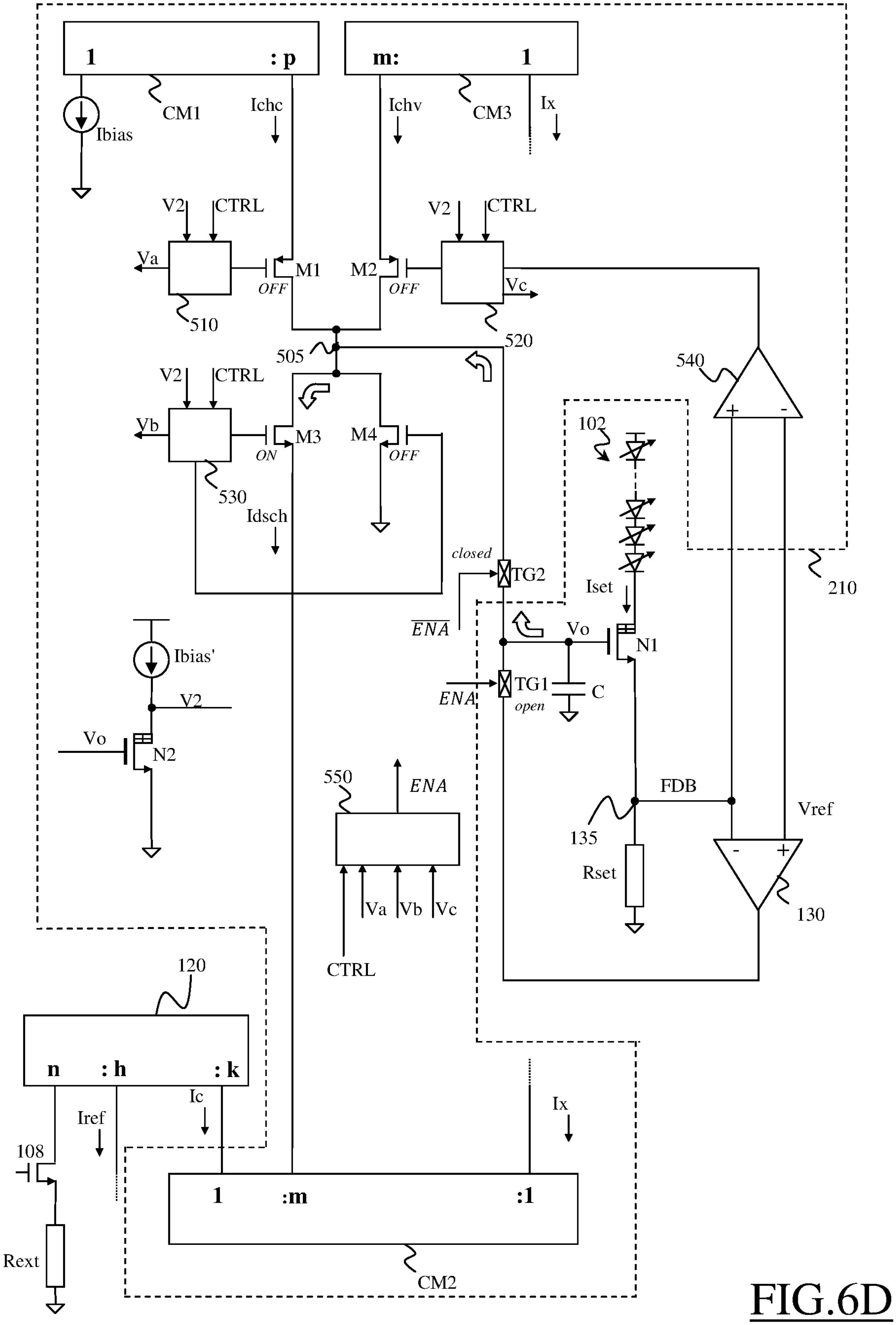
Figure 6E:
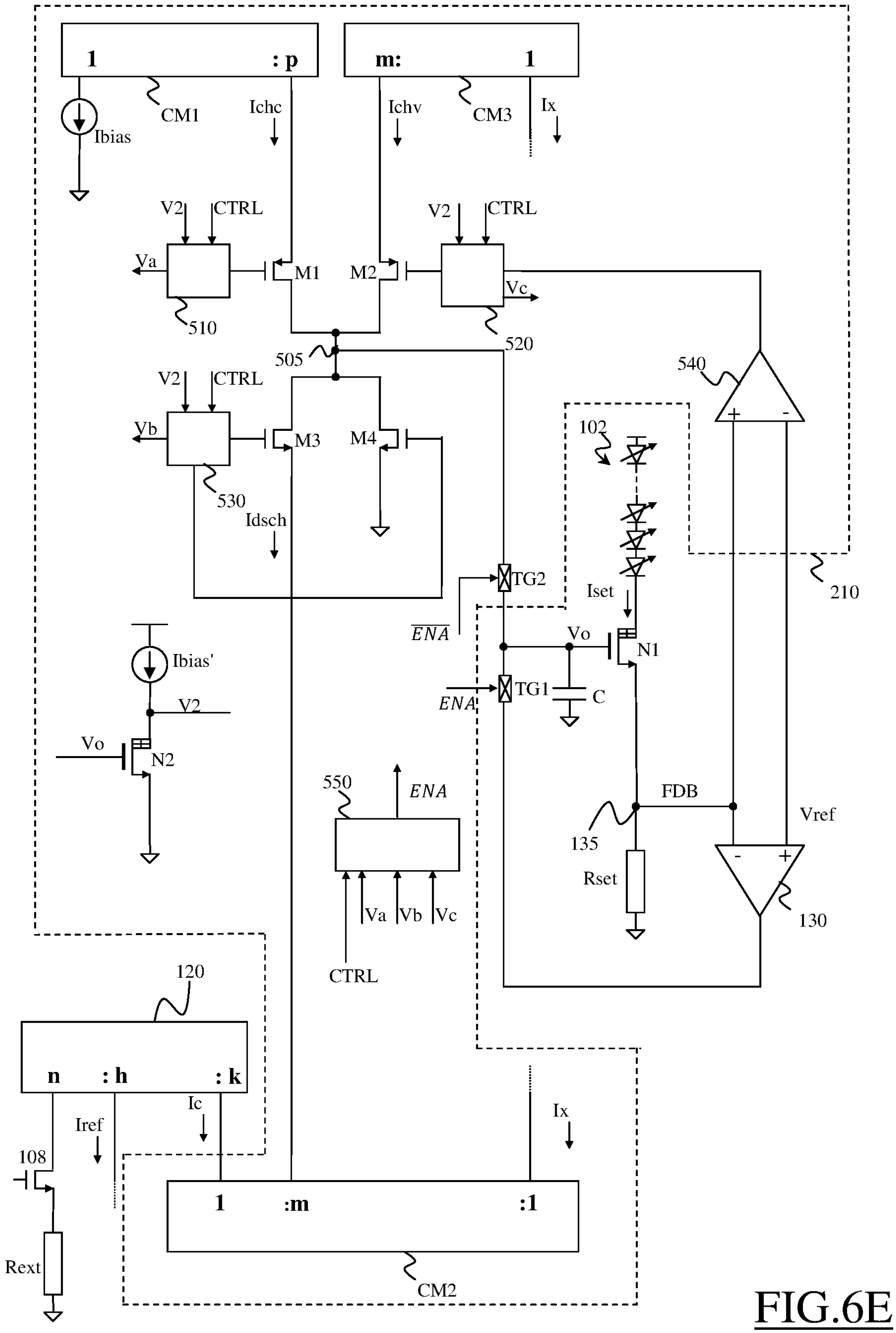

FIG. 5 illustrates in details an exemplary implementation of the slew rate control unit 210 according to an embodiment of the present invention.

According to an embodiment of the present invention, the slew rate control unit 210 comprises a first current generator unit comprising a current mirror CM1 having an input terminal connected to a bias current generator Ibias and an output terminal sourcing providing a corresponding first operative charging current Ichc having a value corresponding to the value Ichc (which is independent from the driving current Iset) according to the current generated by the bias current generator Ibias.

According to an embodiment of the present invention, the slew rate control unit 210 further comprises a second generator unit comprising a current mirror CM2 and a current mirror CM3. According to an embodiment of the present invention, the current mirror CM2 comprises an input terminal coupled to the current mirror 120 for receiving the control current Ic, a first output terminal for providing the discharging current Idsch according to the received control current Ic, and a second output terminal for providing to an input terminal of the current mirror CM3 a current Ix according to the received control current Ic. According to an embodiment of the present invention, the current mirror CM3 has an output terminal for providing a second operative charging current Ichv having a value corresponding to the value Ichv (depending on the target value Iset(h) of the driving current Iset) according to the current Ix.

According to an embodiment of the present invention, the current mirrors 120, CM1, CM2, CM3 are configured in the following way.

current mirror 120:

$$Iref=\frac{h}{n}\times\frac{Vbuff}{Rext};\ Ic=\frac{k}{n}\times\frac{Vbuff}{Rext}$$

current mirror CM1:

$$Ichc=p\times Ibias$$

current mirror CM2:

$$Idschv=m\times Ic, Ix=Ic$$

current mirror CM3:

$$Ichv=m\times Ix$$

where h, k, m, n, p are mirror parameters forming the mirror ratios of the current mirrors.

According to an embodiment of the present invention, the slew rate control unit 210 comprises a current switch arrangement comprising four current switching elements M1-M4 and a transmission gate TG2.

According to an embodiment of the present invention, the current switching element M1 comprises a transistor, such as a p-type MOS transistor, having a first conduction terminal (e.g., source) coupled to the output terminal of current mirror CM1 for receiving the first operative charging current Ichc, a second conduction terminal (e.g., drain) connected to a first conduction terminal of the transmission gate TG2 (defining circuit node 505, and a control terminal (e.g., gate) connected to a first charging current control unit 510.

According to an embodiment of the present invention, the current switching element M2 comprises a transistor, such as a p-type MOS transistor, having a first conduction terminal (e.g., source) coupled to the output terminal of current mirror CM3 for receiving the second operative charging current Ichv, a second conduction terminal (e.g., drain) connected to the circuit node 505, and a control terminal (e.g., gate) connected to a second charging current control unit 520.

According to an embodiment of the present invention, the current switching element M3 comprises a transistor, such as a n-type MOS transistor, having a first conduction terminal (e.g., drain) connected to the circuit node 505, a second conduction terminal (e.g., source) connected to the output terminal of current mirror CM2 for receiving the discharging current Idsch, and a control terminal (e.g., gate) connected to a discharging current control unit 530.

According to an embodiment of the present invention, the current switching element M4 comprises a transistor, such as a n-type MOS transistor, having a first conduction terminal (e.g., drain) connected to the circuit node 505, a second conduction terminal (e.g., source) connected to the ground terminal GND, and a control terminal (e.g., gate) connected to the discharging current control unit 530.

According to an embodiment of the present invention, the slew rate control unit 210 further comprises a reference power transistor N2, for example a n-type power MOS transistor having the same or similar size of the power transistor N1, and comprising a first conduction terminal (e.g., source) connected to the ground terminal GND, a control terminal (e.g., gate) coupled to the gate terminal of the power transistor N1 for receiving the voltage V0, and a second conduction terminal (e.g., drain) coupled to a bias current generator Ibias'.

According to an embodiment of the present invention, the first charging current control unit 510, the second charging current control unit 520, and the discharging current control unit 530 have a respective input terminal for receiving the voltage V2 at the drain terminal of the reference power transistor N2.

According to an embodiment of the present invention, the first charging current control unit 510, the second charging current control unit 520, and the discharging current control unit 530 have a further respective input terminal for receiving the control signal CTRL.

According to an embodiment of the present invention, the transmission gate TG2 has a second conduction terminal connected to the gate terminal of the power transistor N1 (and therefore to the second conduction terminal of the transmission gate TG1), and a control terminal for receiving a negated version of the enable signal ENA.

According to an embodiment of the present invention, the slew rate control unit 210 further comprises a comparator 540 having a non-inverting input terminal connected to the inverting input terminal of operational amplifier 130, an inverting input terminal connected to the non-inverting input terminal of operational amplifier 130, and an output terminal connected to an input terminal of the second charging current control unit 520.

According to an embodiment of the present invention, the slew rate control unit 210 further comprises an enable signal generator 550 adapted to generate the enable signal ENA based on an output signal Va generated by the first charging current control unit 510, an output signal Vb generated by the second charging current control unit 520, and based on an output signal Vc generated by the discharging current control unit 530.

FIGS. 6A-6E illustrate how the slew rate control unit 210 of FIG. 5 operates during the phases ph1-ph5 illustrated in FIGS. 3A and 3B according to an embodiment of the present invention.

According to an embodiment of the present invention, the starting condition provides that the control signal CTRL is at the low value, the enable signal ENA is at the low value, the power transistors N1 and N2 are turned off, the transmission gate TG1 is open, the transmission gate TG2 is closed, the voltage V2 at the drain terminal of the reference power transistor N2 is high, and the feedback voltage FDB is lower than the reference voltage Vref, so that the output of the comparator 540 is at a low value. Moreover, the starting point condition provides that transistors M1, M2, M3 and M4 are off, and the driving current Iset is at the value Iset(l) (zero).

According to an embodiment of the present invention, phase ph1 (see FIG. 6A) is triggered by having the control signal CTRL that is switched to the high value, to signal the intention of closing the transmission gate TG1. However, according to an embodiment of the present invention, instead of directly closing the transmission gate TG1 as soon as the control signal CTRL switches to the high value, a precharge of the equivalent capacitance C at the gate terminal of the power transistor N1 is carried out, a first portion thereof corresponding to phase ph1.

Particularly, according to an embodiment of the present invention, when the control signal CTRL is switched to the high value, and the voltage V2 is at the high value, the first charging current control circuit 510 turns on the transistor M1, causing thus a charging current Ich corresponding to the first operative charging current Ichc—i.e., having a value corresponding to the value Ichc, which is independent from the driving current Iset—to flow from the current mirror CM1 to the equivalent capacitance C through the transistor M1 and the transmission gate TG2. The equivalent capacitance C is thus charged, and the voltage V0 is increased at a rate corresponding to the value of first operative charging current Ichc.

According to an embodiment of the present invention, phase ph2 (see FIG. 6B) is triggered when the voltage V0 reaches a value such to cause the activation of the power transistor N1 and of the reference power transistor N2. According to an embodiment of the present invention, as soon as the reference power transistor N2 turns on, and voltage V2 falls to a low value, the first charging current control circuit 510 turns off the transistor M1, while the second charging current control circuit 520 turns on the transistor M2. In this way, a charging current Ich corresponding to the second operative charging current Ichv—i.e., having a value corresponding to the value Ichv, which depends on the target value Iset(h) of the driving current Iset (see equation (1))—is caused to flow from the current mirror CM3 to the equivalent capacitance C through the transistor M2 and the transmission gate TG2. The equivalent capacitance C is thus further charged, and the voltage V0 is further increased, this time at a rate corresponding to the value of second operative charging current Ichv, which in turn depends on the target value Iset(h) of the driving current Iset. During the second phase ph2, the driving current Iset starts to rise, with a rate depending on the second operative charging current Ichv.

According to an embodiment of the present invention, phase ph3 (see FIG. 6C) is triggered when the feedback voltage FDB gets higher than the reference voltage Vref, so that the output of the comparator 540 goes the high value. In this situation, the second charging current control circuit 520 turns off the transistor M2, ending thus the precharge of the equivalent capacitance C, and the enable signal generator 550 is driven for switching the enable signal ENA to the high value, so that the transmission gate TG2 is opened and the transmission gate TG1 is closed, establishing the feedback loop involving the operational amplifier 130 and the power transistor N1 and causing the driving current Iset to take the target value Iset(h).

According to an embodiment of the present invention, phase ph4 (see FIG. 6D) is triggered by having the control signal CTRL that is switched to the low value. In this situation, the enable signal generator 550 is driven through the control signal CTRL for switching the enable signal ENA to the low value—so that the transmission gate TG1 is opened and the transmission gate TG2 is closed—and the discharging current control unit 530 turns on the transistor M3. A discharging current Idsch—i.e., having a value corresponding to the value Idschu, which depends on the (target) value Iset(h) of the driving current Iset (see equation (4))—is therefore caused to flow from the equivalent capacitance C to the current mirror CM2 through the transmission gate TG2 and the transistor M3.

The equivalent capacitance C is thus discharged, and the voltage V0 is decreased, at a rate corresponding to the value of discharging current Idsch, which in turn depends on the target value Iset(h) of the driving current Iset. During the phase ph4, the driving current Iset starts to fall down, with a rate depending on the discharging current Idsch.

According to an embodiment of the present invention, phase ph5 (see FIG. 6E) is triggered when the voltage V0 falls to an extent such to turn off the power transistor N1 and the reference power transistor N2. In this situation, the voltage V2 is at low value, and the discharging current control unit 530 turns off the transistor M3 and turns on the transistor M4, pulling the voltage V0 down to ground voltage. The driving current Iset is therefore at the value Iset(l) (zero).

According to an embodiment of the present invention, the target value Iset(h) of the driving current Iset corresponds to the value Vref of the reference voltage Vref divided by the resistance Rset of the reference resistor Rset:

$$Iset(h) = \frac{Vref}{Rset}. \tag{7}$$

The value Vref of the reference voltage Vref corresponds in turn to the value Iref of the reference current Iref multiplied by the resistance Rd of the DAC 125:

$$Vref = Iref \times Rd \tag{8}$$

The value Iref of the reference current Iref corresponds in turn to the mirror ratio h/n of the current mirror 120 multiplied by the value Vbuff of the voltage Vbuff divided by the resistance Rext of the external resistor Rext:

$$Iref = \frac{h}{n} \times \frac{Vbuff}{Rext}. \tag{9}$$

The value Ic of the control current Ic provided by the current mirror 120 corresponds to the mirror ratio k/n of the current mirror 120 multiplied by the value Vbuff of the voltage Vbuff divided by the resistance Rext of the external resistor Rext:

$$Ic = \frac{k}{n} \times \frac{Vbuff}{Rext} \rightarrow Ic = \frac{k}{h} \times Iref. \tag{10}$$

The value Ichv of the second operative charging current Ichv provided by the slew rate control unit 210 during the second phase ph2 corresponds to the mirror ratio m of the current mirror CM3 multiplied by the value Ic of the control current Ic $$Ichv = m \times Ic \tag{11}$$

By merging equations (10) and (11), the value Ichv of the second operative charging current Ichv provided by the slew rate control unit 210 during the second phase ph2 according to an embodiment of the present invention can be expressed as a function of the reference current Iref:

$$Ichv = m \times \frac{k}{h} \times Iref. \tag{12}$$

By merging equations (8), (10) and (11), it is possible to express the target value Iset(h) of the driving current Iset as function of value Ic of the control current Ic or as a function of the value Ichv of the second operative charging current Ichv provided by the slew rate control unit 210 during the second phase ph2:

$$Iset(h) = \frac{Rd}{Rset} \times \frac{h}{k} \times Ic = \frac{Rd}{Rset} \times \frac{h}{k} \times \frac{1}{m} \times Ichv. \tag{13}$$

Therefore, by merging equations (1) and (13), it is obtained that:

$$Ichv = A \times Iset(h) = \left(\frac{Rd}{Rset} \times \frac{h}{k} \times \frac{1}{m}\right)^{-1} \times Iset(h) \tag{14}$$

i.e., the proportionality coefficient A of equation (1) is equal to $$\left(\frac{Rd}{Rset} \times \frac{h}{k} \times \frac{1}{m}\right)^{-1}.$$

In order to show in greater detail how the slew rate control unit 210 sets the duration Tr of the rising edge of the driving current Iset (from the value Iset(l) to the value Iset(h)) according to an embodiment of the present invention, the following is considered.

During the first phase ph1, the voltage V0 at the gate terminal of the power transistor N1 rises until reaching a value corresponding to the threshold voltage Vth of the power transistor N1:

$$V0 = Vgs = Vth \tag{15}$$

During the second phase ph2, the voltage V0 rises until reaching a value such to cause the driving current Iset to reach the target value Iset(h):

$$V0 = Vgs + \Delta V = Vgs + (Rset \times Iset(h)) \tag{16}$$

During the second phase ph2, the equivalent capacitance C is thus charged in a time period corresponding to the duration T of the rising edge to experience a voltage variation ΔV=Rset×Iset(h), wherein:

$$Tr = \frac{C}{Ichv} \times \Delta V = \frac{C}{Ichv} \times Rset \times Iset(h). \tag{17}$$

Therefore, by merging equations (2) and (17), it is obtained that:

$$Tr = B \times \frac{Iset(h)}{Ichv} = \frac{C}{Ichv} \times Rset \times Iset(h) \tag{18}$$

i.e., the proportionality coefficient B of equation (2) is equal to (C×Rset).

As can be seen in equation (18), the duration T of the rising edge increases as the value Ichv decreases, and vice versa.

Moreover, by merging equations (14) and (18) it is obtained that:

$$Tr = \frac{C}{Ichv} \times Rset \times \frac{Rd}{Rset} \times \frac{h}{k} \times \frac{1}{m} \times Ichv \rightarrow Tr = C \times RD \times \frac{h}{k \times m} = B/A. \quad (19)$$

As shown in equation (19) (and in equation (3)), the slew rate control unit 210 according to embodiments of the present invention allows advantageously setting the duration Tr of the rising edge of the driving current Iset for different target values Iset(h) of the driving current Iset, since equation (19) (and equation (3)) does not provide for a dependency on the target value Iset(h).

Moreover, according to an embodiment of the present invention, the duration T of the rising edge the driving current Iset can be easily set by properly vary the mirror parameters h, k and m.

Similarly, the value Idschv of the discharging current Idsch provided by the slew rate control unit 210 during the fourth phase ph4 corresponds to the mirror ratio m of the current mirror CM2 multiplied by the value Ic of the control current Ic $$Idschv = m \times Ic \quad (20).$$

By merging equations (10) and (20), the value Idschv of the discharging current Ichv provided by the slew rate control unit 210 during the fourth phase ph4 according to an embodiment of the present invention can be expressed as a function of the reference current Iref:

$$Idschv = m \times \frac{k}{h} \times Iref. \quad (21)$$

By merging equations (8), (20) and (21), it is possible to express the target value Iset(h) of the driving current Iset as function of the value Ic of the control current Ic or as a function of the value Idschv of the discharging current Ichv provided by the slew rate control unit 210 during the fourth phase ph4:

$$Iset(h) = \frac{Rd}{Rset} \times \frac{h}{k} \times Ic = \frac{Rd}{Rset} \times \frac{h}{k} \times \frac{1}{m} \times Idschv. \quad (22)$$

Therefore, by merging equations (4) and (22), it is obtained that:

$$Idschv = A' \times Iset(h) = \left(\frac{Rd}{Rset} \times \frac{h}{k} \times \frac{1}{m}\right)^{-1} \times Iset(h) \quad (23)$$

i.e., the proportionality coefficient A' of equation (4) is equal to $$\left(\frac{Rd}{Rset} \times \frac{h}{k} \times \frac{1}{m}\right)^{-1}.$$

In order to show in greater detail how the slew rate control unit 210 sets the duration Tf of the falling edge of the driving current Iset (from the value Iset(h) to the value Iset(l)) according to an embodiment of the present invention, the following is considered.

During the third phase ph3, the voltage V0 at the gate terminal of the power transistor N1 is at a value such to cause the driving current Iset to have a value corresponding to the target value Iset(h):

$$V0 = Vgs + \Delta V = Vgs + (Rset \times Iset(h)) \quad (24).$$

During the fourth phase ph4, the equivalent capacitance C is discharged in a time period corresponding to the duration Tf of the falling edge to experience a voltage variation ΔV=Rset×Iset(h) such that the voltage V0 reaches a value corresponding to the threshold voltage Vth of the power transistor. Therefore, the following equation is obtained:

$$Tf = \frac{C}{Idschv} \times \Delta V = \frac{C}{Idschv} \times Rset \times Iset(h). \quad (25)$$

By merging equations (5) and (25), it is obtained that:

$$Tf = B' \times \frac{Iset(h)}{Idschv} = \frac{C}{Idschv} \times Rset \times Iset(h) \quad (26)$$

i.e., the proportionality coefficient B' of equation (4) is equal to (C×Rset).

As can be seen in equation (26), the duration Tf of the falling edge increases as the value Idschv decreases, and vice versa.

Moreover, by merging equations (23) and (26) it is obtained that:

$$Tf = C \times Rd \times \frac{h}{k \times m} = B'/A'. \quad (27)$$

As shown in equation (27) (and in equation (6)), the slew rate control unit 210 according to embodiments of the present invention allows advantageously setting the duration Tf of the falling edge of the driving current Iset for different target values Iset(h) of the driving current Iset, since equation (27) (and equation (6)) does not provide for a dependency on the target value Iset(h).

Moreover, according to an embodiment of the present invention, the duration Tf of the falling edge the driving current Iset can be easily set by properly vary the mirror parameters h, k and m.

As can be seen by comparing equations (19) and (27), the slew rate control unit 210 is advantageously configured to allow symmetric rising and falling edges, i.e., to have T equal to Tf.

Figure 7A:
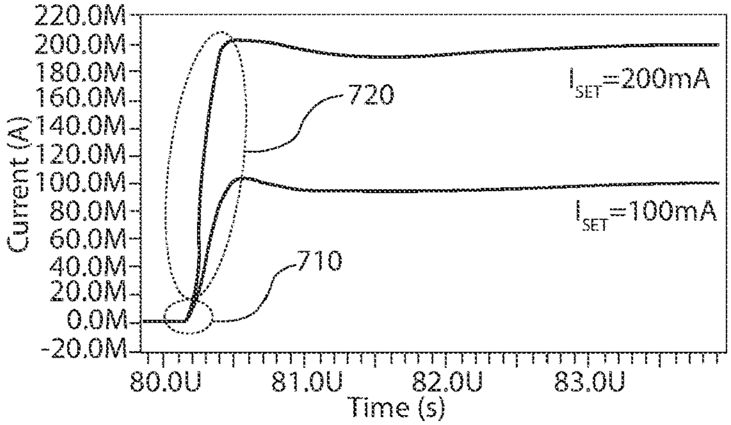
FIG. 7A illustrates exemplary simulation results of how a driving current generated by the LED driver system rises to two different target values according to an embodiment of the present invention.
Figure 7B:
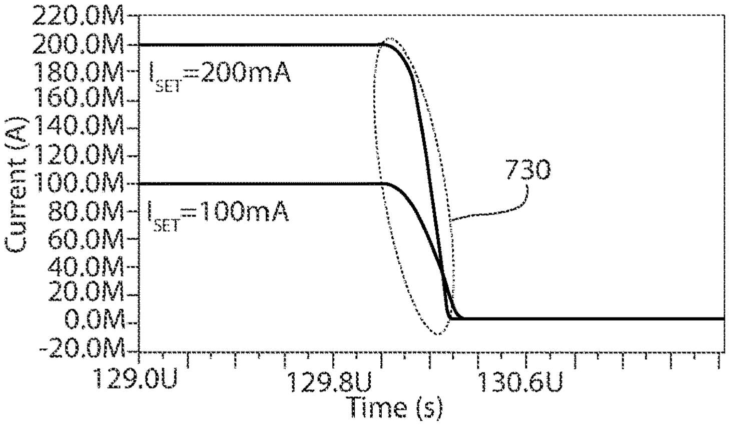
FIG. 7B illustrates exemplary simulation results of how a driving current generated by the LED driver system falls from two different target values according to an embodiment of the present invention.

FIG. 7A illustrates exemplary simulation results of how the driving current Iset rises from a value Iset(l)=0 A to a value Iset(h)(1)=100 mA or to a value Iset(h)(2)=200 mA using the slew rate control unit 210 according to embodiments of the present invention, while FIG. 7B illustrates exemplary simulation results of how the driving current Iset falls from a value Iset(h)(1)=100 mA or a value Iset(h)(2) =200 mA to a value Iset(l)=0 A using the slew rate control unit 210 according to embodiments of the present invention. The portion of the rising edge corresponding to phase ph1 (during which the equivalent capacitance C is charged with a charging current Ich having a value independent from the driving current Iset) is identified in FIG. 7A with reference 710, the portion of the rising edge corresponding to phase ph2 (during which the equivalent capacitance C is charged with a charging current Ich having a value dependent from the value Iset(h) of the driving current Iset) is identified FIG. 7A with reference 720, and the falling edge corresponding to phase ph4 is identified in FIG. 7B with reference 730.

As can be seen in the figures, the duration r of the rising edge of the driving current Iset and the duration Tf of the falling edge of the driving current Iset are the same even if the value Iset(h)(2) is twice the value Iset(h)(1).

In other words, thanks to the proposed solution it is possible to set same durations Tr and/or Tf of the rising and/or falling edges of the driving current Iset for different values Iset(h), i.e., it is possible to set a duration Tr and/or Tf of the rising and/or falling edge of the driving current Iset independently of the actual value of the driving current Iset.

Moreover, compared to the known solutions, it is avoided to obtain too fast current rising/falling edges that may potentially cause undesired Electromagnetic Interference (EMI).

Figure 8A:
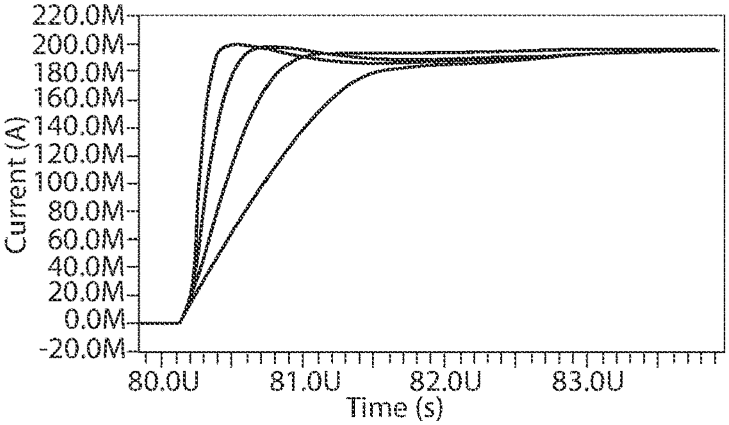
FIGS. 8A and 8B illustrate exemplary simulation results of how the duration of a rising edge of the driving current and a duration of the falling edge of the driving current can be set according to an embodiment of the present invention.
Figure 8B:
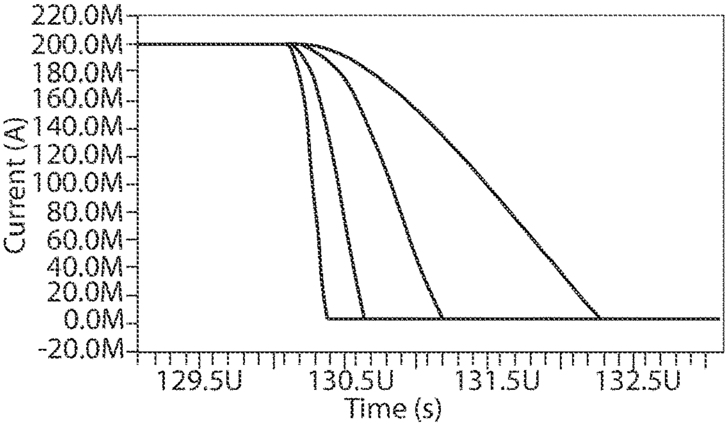

FIGS. 8A and 8B illustrate exemplary simulation results of how the duration T of the rising edge of the driving current Iset and the duration Tf of the falling edge of the driving current Iset varies as the mirror parameters h, k and m are varied.

Figure 9:
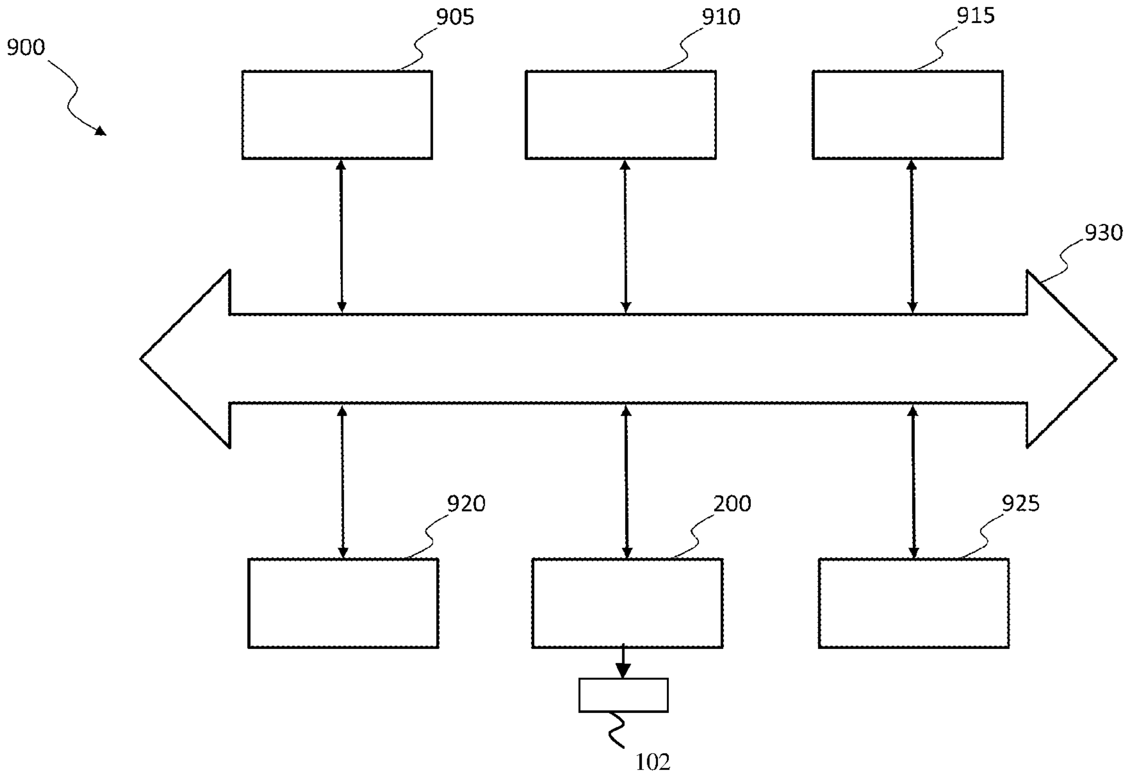
FIG. 9 illustrates in terms of simplified blocks an electronic system including an LED driver system for driving an array of LEDs according to an embodiment of the present invention.

FIG. 9 illustrates in terms of simplified blocks an electronic system goo (or a portion thereof) comprising at least one LED driver system 200 for driving an array of LEDs 102 according to the embodiments of the invention described above.

According to an embodiment of the present invention, the electronic system goo is adapted to be used in electronic devices such as for example personal digital assistants, computers, tablets, and smartphones.

According to an embodiment of the present invention, the electronic system goo may comprise, in addition to the LED driver system 200, a controller 905, such as for example one or more microprocessors and/or one or more microcontrollers.

According to an embodiment of the present invention, the electronic system goo may comprise, in addition to the LED driver system 200, an input/output device 910 (such as for example a keyboard, and/or a touch screen and/or a visual display) for generating/receiving messages/commands/data, and/or for receiving/sending digital and/or analogic signals.

According to an embodiment of the present invention, the electronic system goo may comprise, in addition to the LED driver system 200, a wireless interface 915 for exchanging messages with a wireless communication network (not shown), for example through radiofrequency signals. Examples of wireless interface 915 may comprise antennas and wireless transceivers.

According to an embodiment of the present invention, the electronic system goo may comprise, in addition to the LED driver system 200, a storage device 920, such as for example a volatile and/or a non-volatile memory device.

According to an embodiment of the present invention, the electronic system goo may comprise, in addition to the LED driver system 200, a supply device, for example a battery 925, for supplying electric power to the electronic system 900.

According to an embodiment of the present invention, the electronic system goo may comprise one or more communication channels (buses) for allowing data exchange between the LED driver system 200 and the controller 905, and/or the input/output device 910, and/or the wireless interface 915, and/or the storage device 920, and/or the battery 925, when they are present.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in other embodiments.

What is claimed is:

1. A slew rate control unit comprising:

a first input comprising a non-inverting input of a comparator, wherein the first input is configured to receive a reference voltage;

a second input comprising an inverting input of the comparator, wherein the second input is configured to receive a feedback signal from a conduction terminal of a power transistor;

a first output configured to provide an enable signal to a control terminal of a first transmission gate coupled between an operational amplifier and a control terminal of the power transistor;

a second output configured to provide a charge/discharge current to a control terminal of the power transistor;

wherein the slew rate control unit is configured to:

control a slew rate of a driving current through the power transistor;

selectively charge an equivalent capacitance at the control terminal of the power transistor with a charging current; and selectively discharge the equivalent capacitance with a discharging current, the charging current and the discharging current depending at least in part on a target value of the driving current.

2. The slew rate control unit of claim 1, wherein the first input is configured to be connected to an inverting input terminal of the operational amplifier, and the second input is configured to be connected to a non-inverting input terminal of the operational amplifier.

3. The slew rate control unit of claim 1, further comprising:

a bias current generator configured to generate a bias current;

a second current mirror configured to generate the discharging current during a fourth operative phase according to a control current received from a first current mirror;

a third current mirror configured to generate a second operative charging current during a second operative phase according to the control current; and a fourth current mirror configured to generate a first operative charging current during a first operative phase according to the bias current and independent of the target value of the driving current;

wherein the reference voltage is dependent on a reference current received from the first current mirror and the charging current, and wherein the discharging current is dependent on the control current.

4. The slew rate control unit of claim 3, further comprising:

a current switch arrangement; and a second transmission gate having a first conduction terminal coupled to the current switching arrangement, and a second conduction terminal serving as the second output of the slew rate control unit.

5. The slew rate control unit of claim 4, wherein the current switch arrangement comprises:

a first p-type MOS transistor having a source coupled to an output terminal of the fourth current mirror for receiving the first operative charging current, a drain connected to a first conduction terminal of the second transmission gate, and a gate connected to a first charging current control unit;

a second p-type MOS transistor having a source coupled to an output terminal of the third current mirror for receiving a second operative charging current, a drain connected to the first conduction terminal of the second transmission gate, and a gate connected to a second charging current control unit, wherein the second charging current control unit has an input connected to an output terminal of the comparator;

a first n-type MOS transistor, having a drain connected to the first conduction terminal of the second transmission gate, a source connected to the output terminal of the second current mirror for receiving the discharging current, and a gate connected to a discharging current control unit; and a second n-type MOS transistor having a drain connected to the first conduction terminal of the second transmission gate, a source connected to a ground terminal, and a gate connected to the discharging current control unit.

6. The slew rate control unit of claim 5, further comprising a reference-power transistor having a same or similar size to the power transistor, and comprising a first conduction terminal connected to the ground terminal, a control terminal configured to be coupled to the control terminal of the power transistor, and a second conduction terminal coupled to a reference bias current generator.

7. The slew rate control unit of claim 6, wherein the first charging current control unit, the second charging current control unit, and the discharging current control unit each has an input terminal connected to the second conduction terminal of the reference-power transistor.

8. The slew rate control unit of claim 7, wherein the first charging current control unit, the second charging current control unit, and the discharging current control unit each has a further input terminal for receiving a control signal.

9. The slew rate control unit of claim 8, wherein the second transmission gate has a second conduction terminal configured to be connected to the control terminal of the power transistor and to the second conduction terminal of the first transmission gate, and a control terminal for receiving a negated version of the enable signal.

10. The slew rate control unit of claim 9, further comprising an enable signal generator configured to generate the enable signal based on the control signal, a first output signal generated by the first charging current control unit, a second output signal generated by the second charging current control unit, and a third output signal generated by the discharging current control unit.

11. A method of operating a light emitting diode (LED) driver system, the LED driver system comprising a power transistor having a drain coupled to an array of LEDs and a source coupled to a reference resistor, an operational amplifier having a non-inverting input coupled to a reference voltage, an inverting input coupled to the source of the power transistor, and an output terminal coupled to a first conduction terminal of a transmission gate, the transmission gate having a second conduction terminal coupled to a gate of the power transistor and a control terminal coupled to an enable signal generator, and a slew rate control unit having a first input coupled to the non-inverting input of the operational amplifier, and a second input coupled to the inverting input of the operational amplifier, the method comprising:

selectively activating the power transistor to generate a driving current for the array of LEDs, the selectively activating comprising:

turning on, by the enable signal generator, an enable signal to enable the transmission gate to activate the power transistor; and turning off, by the enable signal generator, the enable signal to disable the transmission gate to deactivate the power transistor;

controlling a slew rate of the driving current;

selectively charging an equivalent capacitance at the gate of the power transistor through a charging current; and selectively discharging the equivalent capacitance through a discharging current, the charging current and the discharging current depending at least in part on a target value of the driving current.

12. The method of claim 11, further comprising:

setting the charging current to a first charge value different from zero and independent from the target value during a first operative phase of the slew rate control unit;

setting the charging current to a second charge value different from zero and dependent on the target value during a second operative phase of the slew rate control unit following the first operative phase;

setting the charging current to zero during a third operative phase of the slew rate control unit following the second operative phase;

setting the discharging current to a discharge value different from zero and dependent on the target value during a fourth operative phase of the slew rate control unit following the third operative phase; and setting the discharging current to zero during a fifth operative phase of the slew rate control unit following the fourth operative phase.

13. The method of claim 12, further comprising:

setting the enable signal to a disabling value to cause deactivation of the power transistor during the first, second, fourth and fifth operative phases; and setting the enable signal to an enabling value to cause activation of the power transistor during the third operative phase.

14. The method of claim 12, wherein:

the second charge value corresponds to the target value multiplied by a first proportionality coefficient; and the method comprises setting a duration of a rising edge of the driving current during the second operative phase to a value corresponding to a second proportionality coefficient multiplied by a ratio between the target value and the second charge value.

15. The method of claim 14, wherein:

the discharge value corresponds to the target value multiplied by a third proportionality coefficient; and the method comprises setting a duration of a falling edge of the driving current during the fourth operative phase to a value corresponding to a fourth proportionality coefficient multiplied by a ratio between the target value and the discharge value.

16. The method of claim 15, further comprising:

outputting, by a first current mirror, a reference current and a control current according to an external current, the reference voltage depending on the reference current and the charging current, and the discharging current depending on the control current;

generating, by a second current mirror, the discharging current during the fourth operative phase according to the control current; and generating, by a third current mirror, the charging current during the second operative phase according to the control current.

17. The method of claim 16, wherein the first and third proportionality coefficients depend on mirror ratios of the first, second and third current mirrors.

18. The method of claim 14, wherein:

the discharge value corresponds to the target value multiplied by a third proportionality coefficient;

the method comprises setting a duration of a falling edge of the driving current during the fourth operative phase to a value corresponding to a fourth proportionality coefficient multiplied by a ratio between the target value and the discharge value; and the second and fourth proportionality coefficients depend on the reference resistor coupled to the source of the power transistor.

19. The method of claim 12, further comprising:

turning off the power transistor during the first and fifth operative phases;

switching from the first operative phase to the second operative phase in response to a voltage at the gate of the power transistor rising to an extent so as to turn on the power transistor; and switching from the fourth operative phase to the fifth operative phase in response to the voltage at the gate of the power transistor falling to an extent so as to turn off the power transistor.

20. The method of claim 19, further comprising:

increasing, by the charging current, the voltage at the gate of the power transistor from a first voltage value to a second voltage value corresponding to a threshold voltage of the power transistor during the first operative phase;

increasing, by the charging current, the voltage at the gate of the power transistor from the second voltage value to a third voltage value during the second operative phase;

maintaining the voltage at the gate of the power transistor at the third voltage value during the third operative phase, the third voltage value causing the power transistor to generate the driving current at the target value;

decreasing, by the discharging current, the voltage at the gate of the power transistor from the third voltage value to the second voltage value during the fourth operative phase; and maintaining the voltage at the gate of the power transistor at the first voltage value during the fifth operative phase.

* * * * *